United States Patent
Liebelt et al.

(10) Patent No.: US 10,447,892 B2
(45) Date of Patent: Oct. 15, 2019

(54) GENERATION OF SAMPLES FOR A PRINT JOB THAT INCLUDE RESOURCE USAGE ESTIMATES

(75) Inventors: Linda S. Liebelt, Boulder, CO (US); Marquis G. Waller, Beverly, OH (US); Scott Ziegler, Westminster, CO (US)

(73) Assignee: Ricoh Company, Ltd., Tokyo (JP)

( * ) Notice: Subject to any disclaimer, the term of this patent is extended or adjusted under 35 U.S.C. 154(b) by 822 days.

(21) Appl. No.: 13/484,612

(22) Filed: May 31, 2012

(65) Prior Publication Data

US 2013/0321827 A1    Dec. 5, 2013

(51) Int. Cl.
*H04N 1/60*    (2006.01)
*H04N 1/46*    (2006.01)

(52) U.S. Cl.
CPC .............. *H04N 1/46* (2013.01); *H04N 1/60* (2013.01); *H04N 1/6013* (2013.01)

(58) Field of Classification Search
CPC ................................ H04N 1/60; G06K 15/02
See application file for complete search history.

(56) References Cited

U.S. PATENT DOCUMENTS

| | | | |
|---|---|---|---|
| 6,252,676 B1 * | 6/2001 | Azima | B41B 21/32 358/1.9 |
| 6,538,770 B1 | 3/2003 | Mestha | |
| 7,280,258 B2 | 10/2007 | Kitahara et al. | |
| 2002/0089514 A1 * | 7/2002 | Kitahara | G06K 15/02 345/600 |
| 2003/0189724 A1 * | 10/2003 | Kloosterman | H04N 1/387 358/1.18 |
| 2006/0197970 A1 * | 9/2006 | Barry | G03G 13/08 358/1.13 |
| 2010/0220341 A1 | 9/2010 | Kondo | |
| 2011/0038002 A1 | 2/2011 | Nakamura et al. | |
| 2011/0043849 A1 | 2/2011 | Koh et al. | |
| 2011/0242575 A1 * | 10/2011 | Owen | G03G 15/50 358/1.15 |
| 2012/0026518 A1 * | 2/2012 | Nishizawa | G03G 15/556 358/1.9 |
| 2013/0057914 A1 * | 3/2013 | Kishimoto | 358/1.15 |

FOREIGN PATENT DOCUMENTS

JP        2009027351 A    2/2009

* cited by examiner

*Primary Examiner* — Frantz Bataille
(74) *Attorney, Agent, or Firm* — Duft & Bornsen, PC (57) ABSTRACT

Systems and methods are provided for generating printed samples of a print job. The system receives a print job, and generates samples for the print job according to different sets of printing parameters. The system determines estimates of printing resource usage based on each set of printing parameters, and initiates printing of the samples along with the resource usage estimates. Further, the system receives user input selecting one of the samples, and initiates printing of the print job according to the printing parameters of the selected sample.

20 Claims, 5 Drawing Sheets

GENERATION OF SAMPLES FOR A PRINT JOB THAT INCLUDE RESOURCE USAGE ESTIMATES

FIELD OF THE INVENTION

The invention relates to the field of printing, and in particular, to generation of samples for a print job that indicate what the job will look like when it is printed.

BACKGROUND

In the field of production printing, incoming print jobs may comprise thousands, if not hundreds of thousands of printed pages. These jobs may therefore be extremely expensive to print, and may take weeks to complete. Because incoming jobs are so large and expensive, it is desirable to ensure that the jobs are printed correctly on the first run. In order to ensure that the job will print as desired, operators often perform a test print of a job where a sample of the pages of the job are printed. The pages of the test print may then be reviewed in order to check for problems with color, for typos, for general print quality concerns, etc.

Unfortunately, the quality at which a print job will be printed often is a function of cost, and an excellent quality print job may cost substantially more than a print job that simply meets the quality standards of the print shop. This means that if the best print quality is selected every time, the cost to the customer is substantial, which is undesirable. As such, print shop operators are often forced to carefully balance between cost efficiency and print quality for a given job.

SUMMARY

Embodiments described herein generate samples of printed material for a print job that include estimates of resource usage. The samples are generated using different sets of printing parameters, and the estimates indicate an amount of printing resources used for a given set of printing parameters (e.g., the cost and/or marking material used). Thus, a print shop operator may quickly review these physical samples for the print job to determine how the print job would actually appear if it were printed according to the different sets of parameters. The print shop operator can further compare the estimated resource usage to the print quality for the samples to determine which sample provides the best balance thereof.

One embodiment is a system for generating printed samples. The system comprises an interface operable to receive a print job, and a control unit. The control unit is operable to generate samples for the print job according to different sets of printing parameters, to determine estimates of printing resource usage based on each set of printing parameters, and to initiate printing of the samples along with the resource usage estimates. The control unit is further operable to receive user input selecting one of the samples, and to initiate printing of the print job according to the printing parameters of the selected sample.

Another embodiment is a method for generating printed samples. The method comprises receiving a print job, generating samples for the print job according to different sets of printing parameters, and determining estimates of printing resource usage based on each set of printing parameters. The method also includes initiating printing of the samples along with the resource usage estimates. Further, the method includes receiving user input selecting one of the samples, and initiating printing of the print job according to the printing parameters of the selected sample.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
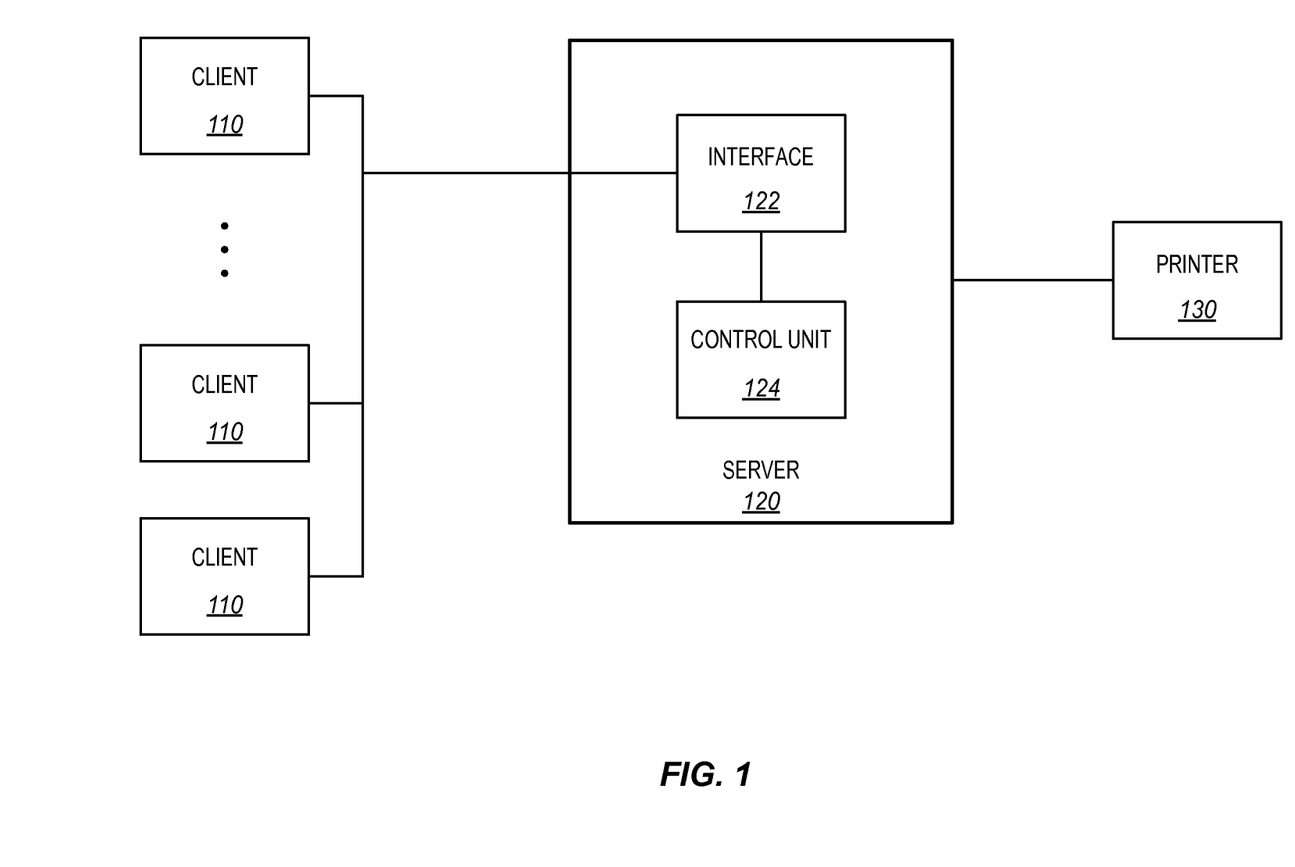
FIG. 1 is a block diagram of a printing system in an exemplary embodiment.

FIG. 1 is a block diagram of a printing system 100 in an exemplary embodiment. Printing system 100 comprises any system, device, or component operable to manage and print received print jobs. In this embodiment, printing system 100 comprises multiple clients 110, a server 120, and a printer 130. Printing system 100 is enhanced in order to generate multiple samples (e.g., preview prints) of an incoming print job. Each sample is printed according to a different set of printing parameters. Printing system 100 is further enhanced to estimate resource usage for each sample, and to include these estimates with the printed samples. This allows an operator at the print shop to review multiple samples at once to decide which parameters offer the best combination of cost, quality, and materials usage for the print job.

Printing parameters applied to a print job (e.g., by server 120 or printer 130), as described herein do not comprise the print data for the job, but rather comprise processing instructions for turning that print data into a printed product. For example, a printing parameter may specify a type of media (e.g., a paper weight, quality, gloss amount), a color profile to be used in printing the print job (e.g., an International Color Consortium (ICC) color profile, a color profile utilizing Gray Component Replacement (GCR), etc.), a resolution (e.g., in Dots Per Inch (DPI)) for the print job, etc.

Clients 110 comprise any systems, components, or devices operable to allow a user to interact with printing system 100. For example, clients 110 may comprise general purpose computers implementing client software for interacting with server 120 via a network connection. Clients 110 are operable to acquire print jobs based on received user input, and to submit those print jobs to server 120 for processing.

Server 120 comprises any system, component, or device operable to manage the operations of one or more printers to print received jobs. Server 120 may comprise, for example, a general purpose or special purpose computer implementing software instructions to direct printer 130 in printing incoming jobs. In this embodiment, server 120 comprises interface 122 and control unit 124. Interface 122 comprises any system, component, or device operable to manage communications with clients 110. For example, interface 122 may comprise an Ethernet interface, an IEEE 802.11 wireless networking interface, etc. Control unit 124 comprises any system, component, or device operable to manage the operations of server 120. For example, control unit 124 may comprise a processor and memory used to manage the server-side processing and distribution of received print jobs.

Server 120 may be further operable to schedule received print jobs from clients 110 for printing at printer 130. In print shop environments where multiple printers and other print shop devices are available such as binders, staplers, and hole-punchers, server 120 may schedule print jobs for processing at the various devices based upon any number of criteria defined by the print shop operator. Further, server 120 may be operable to perform additional processing on the received print jobs.

Printer 130 comprises any system, component, or device operable to mark images onto media. For example, printer 130 may comprise a continuous form production printer or a cut-sheet printer. Printer 130 typically includes a print controller operable to receive and process (e.g., rasterize) incoming print data based on received printing parameters, and typically further includes a marking engine for marking images (e.g., via ink, toner, etc.) onto the media that it processes. Further details of the operation of printing system 100 will be discussed with regard to FIG. 2.

Figure 2:
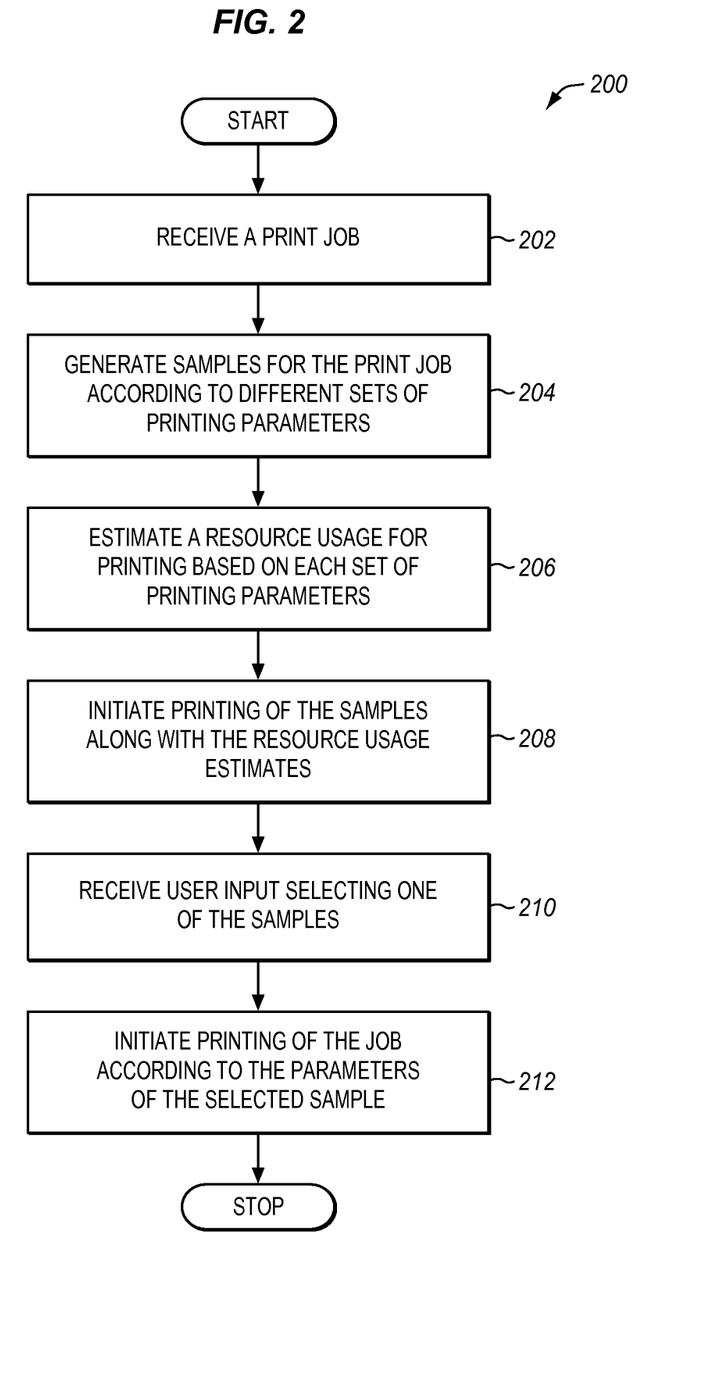
FIG. 2 is a flowchart illustrating a method for generating samples for a print job in an exemplary embodiment.

FIG. 2 is a flowchart illustrating a method 200 for generating samples for a print job in an exemplary embodiment. The steps of method 200 are described with reference to printing system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, interface 122 receives a print job from a client 110. The print job may comprise, for example, print data defined according to a Page Description Language (PDL). In step 204, control unit 124 generates samples for the print job. Each sample is generated according to a different set of printing parameters. A sample may comprise one or more pages having content that the print operator wishes to compare. For example, a sample may include one or more pages of the print job that are representative of the print job as a whole. As such, a sample may comprise the first several pages of the print job, or may comprise pages of the print job that include a logo or other graphical mark (e.g., trademarks or service marks) that should be reviewed to ensure that brand management standards are met. In one embodiment, a sample includes a color page of the print job, a black and white page of the print job, a page of the print job with graphics, and/or a page of the print job with text. In a further embodiment, a sample comprises a set of pages of the print job selected via a client 110.

Information describing the number of samples to generate and the printing parameters to apply to each sample may be predefined at print server 120, may be acquired along with the print job from client 110, or may be acquired from another memory remote from print server 120. In one embodiment, the printing parameters for each sample are included within a job ticket, such as a Job Definition Format (JDF) job ticket transmitted by a client 110, and the printing parameters for each sample specify a type of media, a color profile to be used in printing the print job, a resolution for the print job, etc. As a part of generating the samples, server 120 may apply certain parameters directly to the print data, while other printing parameters may be transmitted to printer 130 for application during printing.

In step 206, control unit 124 estimates a printing resource usage based on each set of printing parameters. Because the samples are each generated according to a different set of printing parameters, each sample will be associated with a different estimate. The estimate may indicate resource usage for the entire sample, for individual pages of the sample, or for the print job as a whole. Examples of printing resources include, for example, a monetary cost, an amount of marking material used during printing, etc. In one embodiment, control unit 124 generates the estimates by rasterizing the print data from the selected pages according to the parameters for a sample, and then using estimation techniques to determine the resource usage for the sample. Such estimation techniques could include counting pels used for each sample, and then extrapolating an estimated usage of ink based upon halftoning and/or other print quality adjustments applied to those pels. The estimates for individual pages can then be extrapolated to the entire print job, if desired.

If the resource usage data includes marking material usage, the estimate may be performed in aggregate, or on a color-by-color basis (e.g., a separate estimate for each colorant, such as Cyan, Magenta, Yellow, and Black). Typically, cost will be a function of the marking material and media used, at least to some degree. Furthermore, cost may vary depending upon the color of the marking material used. In one embodiment, an InfoPrint ProcessDirector (IPPD) Estimate Ink function of an IP 5000 print engine is used to perform the estimation.

In step 208, control unit 124 initiates printing of the samples along with the resource usage estimates. For example, control unit 124 may instruct printer 130 to print the samples along with the estimates of resource usage. Each sample is processed according to a different set of printing parameters. Thus, a first sample may be printed on glossy paper according to a first ICC color profile, while a second sample may be printed on matte paper according to a second ICC color profile.

Typically, the estimates may be located on entirely separate pages from the printed content that is compared by the print operator. However, in some circumstances the estimates for a sample may be included directly on the pages of the sample that are visually compared by the print operator. In such cases, the estimates may be included in a margin of these pages. The printed estimates may indicate the estimated cost, marking material usage, etc., for the set of parameters. The printed estimates may further indicate a name for the set of parameters that were used to generate the sample, and any other desired information relating to the sample. For example, the printed estimates may explicitly indicate the color profile used, media used, marking material used, Gray Component Replacement (GCR) scheme used, etc.

Upon receiving the printed estimates along with the samples, the print shop operator may directly compare the visual quality of each sample, and may further compare the amount of print shop resources used for each sample. This allows the operator to select the best balance of cost and quality for printing the job. Typically, step 208 will be coordinated so that the printed estimates for each sample are placed immediately before or after the printed pages of that sample.

In step 210, server 120 receives input from the operator selecting a sample. This input may be received, for example, via a console of printer 130, via a client 110, or directly at an interface of server 120. Control unit 124 then initiates printing of the job according to the parameters of the selected sample. For example, control unit 124 may instruct printer 130 to print the job according to the parameters of the selected sample in step 212. Control unit 124 may transmit a job ticket indicating the set of parameters, along with the print data for the job, to printer 130. Printer 130 then processes and prints the entire job according to the parameters.

Using method 200 described above, a print shop operator may dynamically compare the price, ink usage, and print quality of multiple different workflows that could be used to print a job all at once by reviewing the samples. This provides a benefit over the existing art because it gives the print shop operator the tools that they need to determine the best balance of cost, quality, and resource usage for a given print job.

EXAMPLES

In the following examples, additional processes, systems, and methods are described in the context of a printing system that generates samples for a print job that indicate how the print job would look if it were printed according to different parameters, and that also indicate a resource usage for each sample.

In this example the printing system is an Advanced Function Presentation (AFP) printing system managed by an InfoPrint ProcessDirector (IPPD) server. The IPPD server includes a number of sets of printing parameters, and these parameters include International Color Consortium (ICC) color profiles.

A user at a client wishes to submit a print job for printing, but does not know which set of printing parameters of the server to use for their print job. The user therefore submits the print job to the IPPD server along with a request to generate multiple samples for the job (one for each set of parameters stored at the server). Along with the print job, the user selects a list of pages from the print job that will be used to generate the samples. The IPPD server processes the print data of the selected pages using each set of stored parameters, and estimates a cost and ink usage for each sample. For example, the IPPD server may review the different workflow steps associated with each set of stored parameters, and these workflow steps can indicate how the pages of the sample should be printed. In another example, the parameters are passed to the IPPD server in an overrides file. The IPPD server further generates an estimation page indicating the cost and ink usage for each sample by using AFP commands. The IPPD server then instructs a continuous form printer to print the samples, including the estimation pages.

In further embodiments, preflight tools and software may be utilized to ensure that image and formatting within the print job and/or sample are properly accounted for. Such preflight tools may further be utilized to apply different color spaces and/or formatting adjustments to the different samples.

Figure 3:
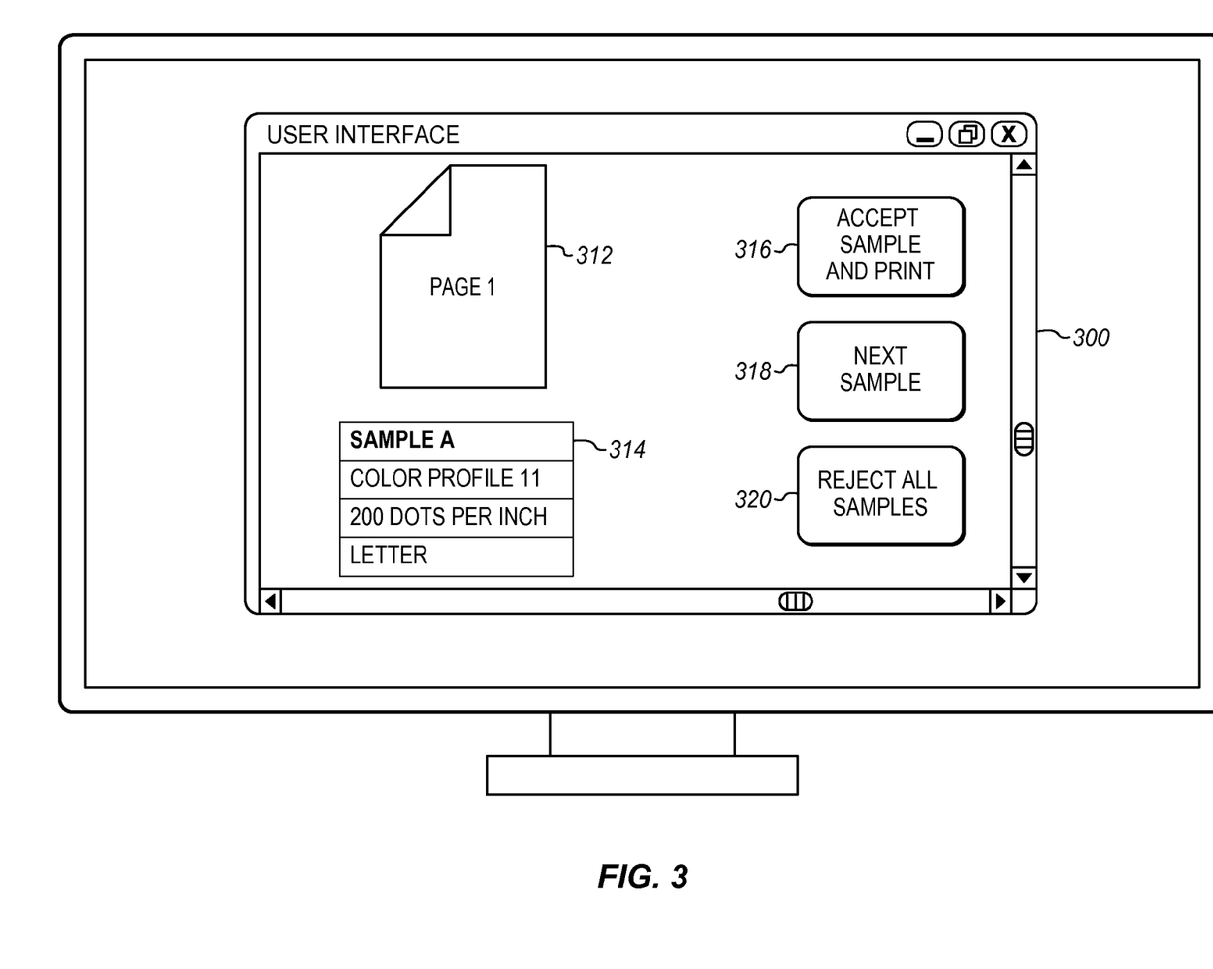
FIG. 3 is a block diagram illustrating a user interface for managing samples for a print job in an exemplary embodiment.

FIG. 3 is a block diagram illustrating a user interface 300 for managing samples for a print job in an exemplary embodiment. For example, user interface 300 may be used by a print shop operator to select set of parameters to use when printing a received job. According to FIG. 3, user interface 300 includes a digital preview 312 of a print job, a representation indicating the set of parameters 314 currently applied to the print job, a button 316 to print the entire job according to the current set of parameters, a button 318 to iterate to a next set of parameters, and a button 320 allowing the user to reject sets of parameters.

While digital preview 312 provides a rough idea of what the printed output will look like under a given set of printing parameters, those skilled in the art will appreciate that it is not possible to accurately show how the printed output will actually look without printing the pages of the job. This is because issues such as differences in gloss between a screen and printed media, differences between the way the media bleeds pels of marking material and the way a screen bleeds light from pixels, differences in converting colors between printer colors schemes (e.g., CMYK) and digital display color schemes (e.g., RGB), and other factors will inherently create a digital preview that is inaccurate to some degree. This is undesirable, particularly when the print job includes branded images that should be printed with a very specific shade of a given color. As such, digital preview 312 serves more as an error checking preview (to make sure that the right job is being printed) than it serves to show what the exact printed output of the job will look like.

Sample parameters 314 are represented at user interface 300 as a brief textual description of the printing parameters that are used to generate a preview print for the current sample. Thus, sample parameters 314 can be checked by the user to ensure that they include the desired parameters for a given sample.

In this example, the IPPD server pauses after the completion of each sample in order to determine whether a user at the client approves of the sample and wishes to print the entire job using the same parameters. To this end, button 316 allows the user to accept the sample and print the job. This may be useful in scenarios where the user does not wish to iterate through every available sample in order to select a "best" sample, but rather simply wants to print the first sample that is good enough to get the job done. When a user presses button 316, a message is sent by the client to the IPPD server, and a control unit of the IPPD server initiates printing of the entire job according to the parameters of the current sample.

Button 318 allows an operator to process and print a next sample for the print job. Thus, when a user presses button 318, a message is sent to the IPPD server. A control unit of the IPPD server then processes the selected pages of print data according to the new parameters, acquires estimates for the new sample, and instructs the AFP printer to print the sample as well as a separate page indicating cost and ink usage for the sample. The print shop operator may then review the printed output to see if they approve of the sample or desire a different one.

Button 320 allows an operator to reject all samples that have been presented. Typically, the IPPD server will then allow the user to define a new sample with new printing parameters, although the IPPD server may also simply halt the printing process at this time and generate an error condition for the job, or cancel the job.

Figure 4:
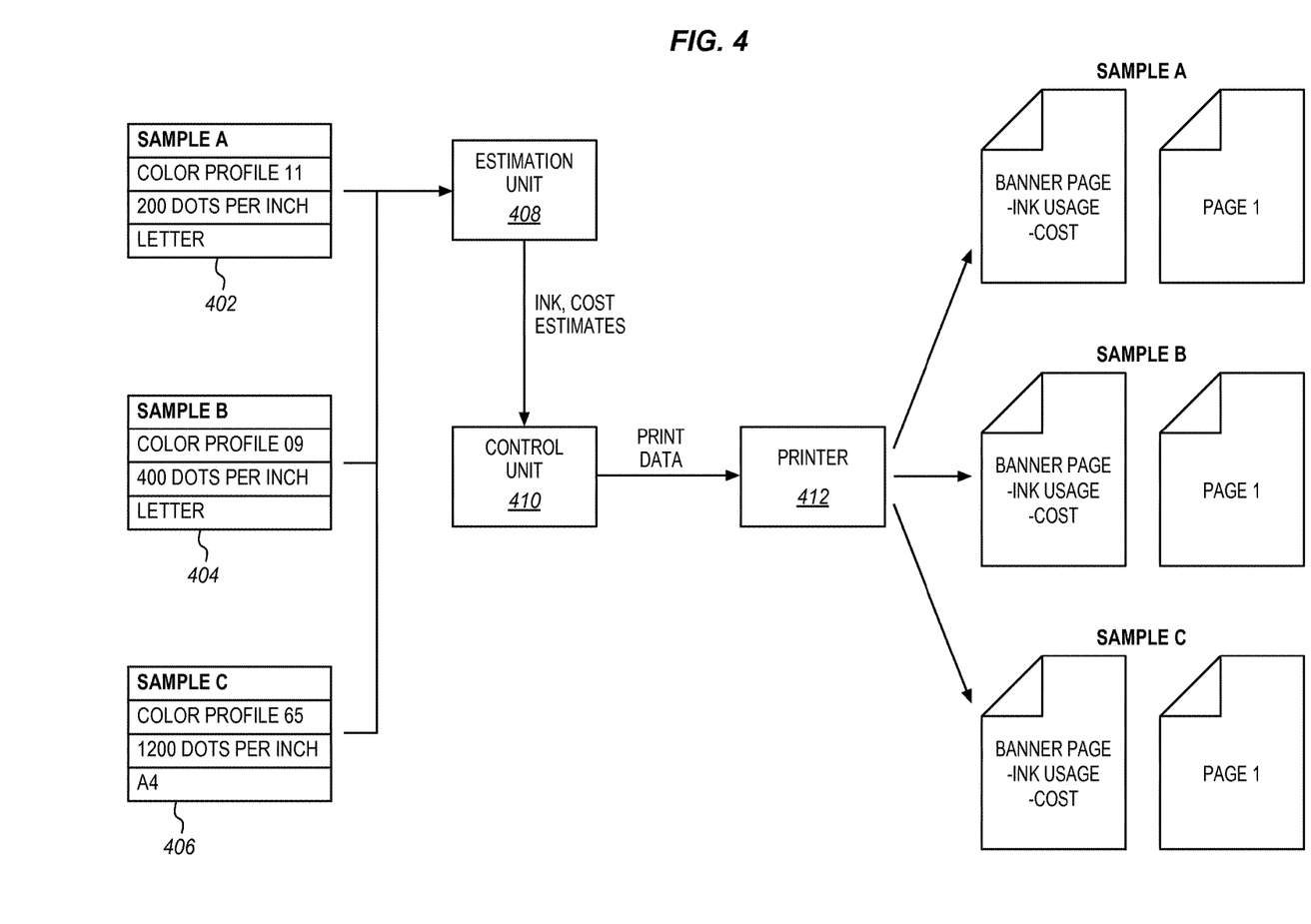
FIG. 4 is a block diagram illustrating the generation of multiple samples for a print job in an exemplary embodiment.

FIG. 4 is a block diagram illustrating the generation of multiple samples for a print job in an exemplary embodiment. According to FIG. 4, the IPPD server includes stored parameters 402-406, relating to sample A, sample B, and sample C, respectively. Each sample has a different set of printing parameters to be used in generating a printed output. Each time a sample is selected, estimation unit 408 of the IPPD server generates a rasterized version of the print data for the sample. Based on this rasterized version, information about the media to be used, and other factors, estimation unit 408 estimates a cost as well as an ink usage for the sample. Control unit 410 uses this data from estimation unit 408 and generates and rasterizes an estimation page that includes the estimates of cost and ink usage. Then, control unit instructs printer 412 to print the sample, and also to print the internally generated estimation page.

Printer 412 proceeds to print the pages of the sample, as well as the estimation page. An operator may then review the sample to decide whether they approve of it or desire a different one. In a further embodiment, all of the samples may be printed at once, and a print shop operator may select an appropriate sample by comparing them against each other.

Figure 5:
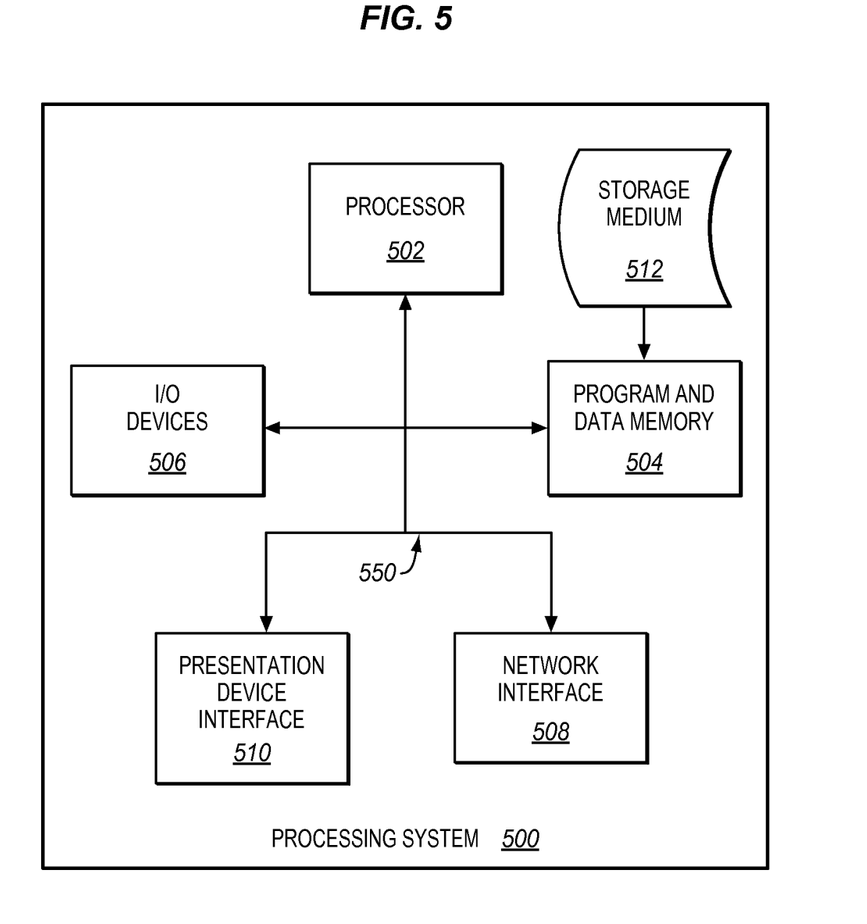
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 5 illustrates a processing system 500 operable to execute a computer readable medium embodying programmed instructions to perform desired functions in an exemplary embodiment. Processing system 500 is operable to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 may also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be integrated with the system to interface to one or more presentation devices, such as printing systems and displays for presentation of presentation data generated by processor 502.

Although specific embodiments were described herein, the scope of the invention is not limited to those specific embodiments. The scope of the invention is defined by the following claims and any equivalents thereof.

We claim:

1. A system comprising:
   memory to store different sets of printing parameters used to output print jobs, each set of printing parameters identifying a different combination of an International Color Consortium (ICC) profile and a media type;
   an interface operable to receive a print job that includes multiple pages;
   a control unit operable to identify a selection of a sample page among the multiple pages to represent the print job, to generate multiple versions of the sample page by rasterizing the sample page multiple times using one of the different sets of printing parameters for each rasterization, and to determine an estimate of printing resource usage for each of the multiple versions of the sample page using one of the different sets of printing parameters for each estimate; and
   a printer to print the multiple versions of the sample page using one of the different sets of printing parameters for each print, wherein each print includes an output of a version of the sample page and an output indicating the estimate of printing resource usage for the version of the sample page;
   the control unit further operable to receive user input that identifies a selected one of the different sets of printing parameters used to print the sample page; and
   the printer further operable to print the print job with the selected one of the different sets of printing parameters.

2. The system of claim 1 wherein:
   the control unit is further operable to determine resource usage estimates as costs.

3. The system of claim 1 wherein:
   the control unit is further operable to determine resource usage estimates as amounts of marking material used for printing.

4. The system of claim 3 wherein:
   the control unit is further operable to determine an amount of marking material used for each colorant utilized for printing.

5. The system of claim 1 wherein:
   the estimate of printing resource usage is different for each rasterization of the sample page.

6. The system of claim 1 wherein:
   for each of the multiple versions, the output of the version of the sample page and the output indicating the estimate of printing resource usage is on a separate printed page.

7. The system of claim 1 wherein:
   the control unit is further operable to determine the estimate of printing resource usage for printing the print job as a whole for each of the multiple versions of the sample page.

8. The system of claim 1 wherein:
the control unit is further operable to determine the estimate of printing resource usage for printing the sample page.

9. The system of claim 1 wherein:
the control unit is further operable to pause after each version of the sample page is printed, to determine whether a user has accepted a most-recently printed version, and to instruct the printer to print the print job according to printing parameters for the most-recent sample responsive to determining that the user has accepted the most-recently printed version.

10. A method comprising
storing different sets of printing parameters used to output print jobs, each set of printing parameters identifying a different combination of an International Color Consortium (ICC) profile and a media type;
receiving a print job that includes multiple pages;
identifying a selection of a sample page among the multiple pages to represent the print job;
generating multiple versions of the sample page of the print job by rasterizing the sample page multiple times using one of the different sets of printing parameters for each rasterization;
determining an estimate of printing resource usage for each of the multiple versions of the sample page using one of the different sets of printing parameters for each estimate;
printing the multiple versions of the sample page using one of the different sets of printing parameters for each printing, wherein each printing includes an output of a version of the sample page and further includes an output indicating the estimate of printing resource usage for the version of the sample page;
receiving user input that identifies a selected one of the different sets of printing parameters used for printing the sample page; and
printing the print job with the selected one of the different sets of printing parameters.

11. The method of claim 10 wherein determining estimates comprises:
determining an estimated cost for printing.

12. The method of claim 10 wherein determining estimates comprises:
determining an amount of marking material used for printing.

13. The method of claim 12 wherein determining estimates comprises:
determining amount of marking material used for each colorant utilized for printing.

14. The method of claim 10 wherein:
the estimate of printing resource usage is different for each rasterization of the sample page.

15. The method of claim 10 wherein:
for each of the multiple versions, the output of the version of the sample page and the output indicating the estimate of printing resource usage is on a separate printed page.

16. The method of claim 10 further comprising:
determining the estimate of printing resource usage for printing the print job as a whole for each of the multiple versions of the sample page.

17. The method of claim 10 further comprising:
determining the estimate of printing resource usage for printing the sample page.

18. The method of claim 10 further comprising:
pausing after each version of the sample page is printed, determining whether a user has accepted a most-recently printed version, and printing the job according to parameters for the most-recently printed version responsive to determining that the user has accepted the most-recently printed version rasterization.

19. A non-transitory computer readable medium embodying programmed instructions which, when executed by a processor of a print server, are operable for performing a method comprising:
storing different sets of printing parameters used to output print jobs, each set of printing parameters identifying a different combination of an International Color Consortium (ICC) profile and a media type;
receiving a print job that includes multiple pages;
identifying a selection of a sample page among the multiple pages to represent the print job;
generating multiple versions of the sample page of the print job by rasterizing the sample page multiple times using one of the different sets of printing parameters for each rasterization;
determining an estimate of printing resource usage for each of the multiple versions of the sample page using one of the different sets of printing parameters for each estimate;
printing the multiple versions of the sample page using one of the different sets of printing parameters for each printing, wherein each printing includes an output of a version of the sample page and further includes an output indicating the estimate of printing resource usage for the version of the sample page;
receiving user input that identifies a selected one of the different sets of printing parameters used for printing the sample page; and
printing the print job with the selected one of the different sets of printing parameters.

20. The medium of claim 19, wherein determining estimates comprises:
determining an estimated cost for printing.

* * * * *